(12) United States Patent
Jeon et al.

(10) Patent No.: US 7,583,620 B2
(45) Date of Patent: Sep. 1, 2009

(54) LINK ADAPTATION METHOD USING FEEDBACK INFORMATION FOR WIRELESS COMMUNICATION SYSTEM

(75) Inventors: Taehyun Jeon, Sungnam (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 721 days.

(21) Appl. No.: 10/855,274

(22) Filed: May 26, 2004

(65) Prior Publication Data

US 2005/0122912 A1 Jun. 9, 2005

(30) Foreign Application Priority Data

Dec. 8, 2003 (KR) ...................... 10-2003-0088540

(51) Int. Cl.
*H04B 1/44* (2006.01)
*H04J 3/16* (2006.01)
*H04J 3/22* (2006.01)
*H04B 1/00* (2006.01)
*H04B 7/00* (2006.01)

(52) U.S. Cl. ........................... 370/282; 370/468; 455/69
(58) Field of Classification Search ................. 370/252, 370/465, 468, 332–334, 280–282; 455/69
See application file for complete search history.

(56) References Cited

U.S. PATENT DOCUMENTS 6,567,375 B2   5/2003   Balachandran et al.

| | | | | |
|---|---|---|---|---|
| 2003/0003863 A1* | 1/2003 | Thielecke et al. | ............. | 455/39 |
| 2003/0022686 A1* | 1/2003 | Soomro et al. | ............... | 455/522 |
| 2003/0118128 A1* | 6/2003 | Liang | .......................... | 375/316 |
| 2003/0129943 A1* | 7/2003 | Park et al. | .................. | 455/13.4 |
| 2004/0106425 A1* | 6/2004 | Koo et al. | .................... | 455/522 |
| 2005/0064872 A1* | 3/2005 | Osseiran et al. | .......... | 455/452.1 |
| 2006/0128318 A1* | 6/2006 | Agarossi et al. | ............... | 455/69 |

OTHER PUBLICATIONS

Iordanis Koutsopoulos et a., "Link Adaptation Policies for Wireless Broadband Networks", 0-7803-7206-9/01/ 2001 IEEE (pp. 572-576).
Qiao, D., et al., "Goodput enhancement of IEEE 802.11a wireless LAN via link adaptation", IEEE ICCC'2001, Jun. 2001, pp. 1995-2000, vol. 7.

* cited by examiner

*Primary Examiner*—Kevin C Harper
*Assistant Examiner*—Jianye Wu
(74) *Attorney, Agent, or Firm*—Blakely, Sokoloff, Taylor & Zafman LLP (57) ABSTRACT

Disclosed is a link margin adaptation method using feedback information of a wireless communication system. For transmission and reception of data between two nodes of the wireless communication system, a transmission node requests a receiving node to transmit a link margin. The transmission node receives the link margin, and selects one of a white noise table or a delay spread table according to a delay spread value between the two nodes. Then, the transmission node adapts a link between the two nodes to a transmission mode and decides a transmission rate to transmit data at the decided transmission rate, thereby improving transmission capacity of the wireless communication system, obtaining the optimum link state, extending power utilization time of stations, and reducing interference between stations.

10 Claims, 6 Drawing Sheets

LINK ADAPTATION METHOD USING FEEDBACK INFORMATION FOR WIRELESS COMMUNICATION SYSTEM

CROSS REFERENCE TO RELATED APPLICATION

This application is based on Korea Patent Application No. 2003-88540 filed on Dec. 8, 2003 in the Korean Intellectual Property Office, the entire content of which is incorporated herein by reference.

BACKGROUND OF THE INVENTION (a) Field of the Invention

The present invention relates to a link adaptation method using feedback information for a wireless communication system. More particularly, the invention relates to a link adaptation method using feedback information for a wireless communication system, which transmits and receives data depending on the state of a data transmission link to increase transmission capacity.

(b) Description of the Related Art

Link adaptation in a data communication system is a technique that selects a transmission power, a modulation method, a packet length, etc. depending on the state of a link through which data is transmitted and received so as to increase the transmission capacity of the data communication system. The link adaptation technique is divided into a technique of supposing symmetry of a link, and a technique of supposing asymmetry of a link. The former considers the state of a data transmission link from an access point (AP) to a station (STA) to be identical to that of a transmission link from the STA to the AP, while the latter supposes that the state of the data transmission link from the AP to the STA is different from the state of the data transmission link from the STA to the AP.

Figure 1:
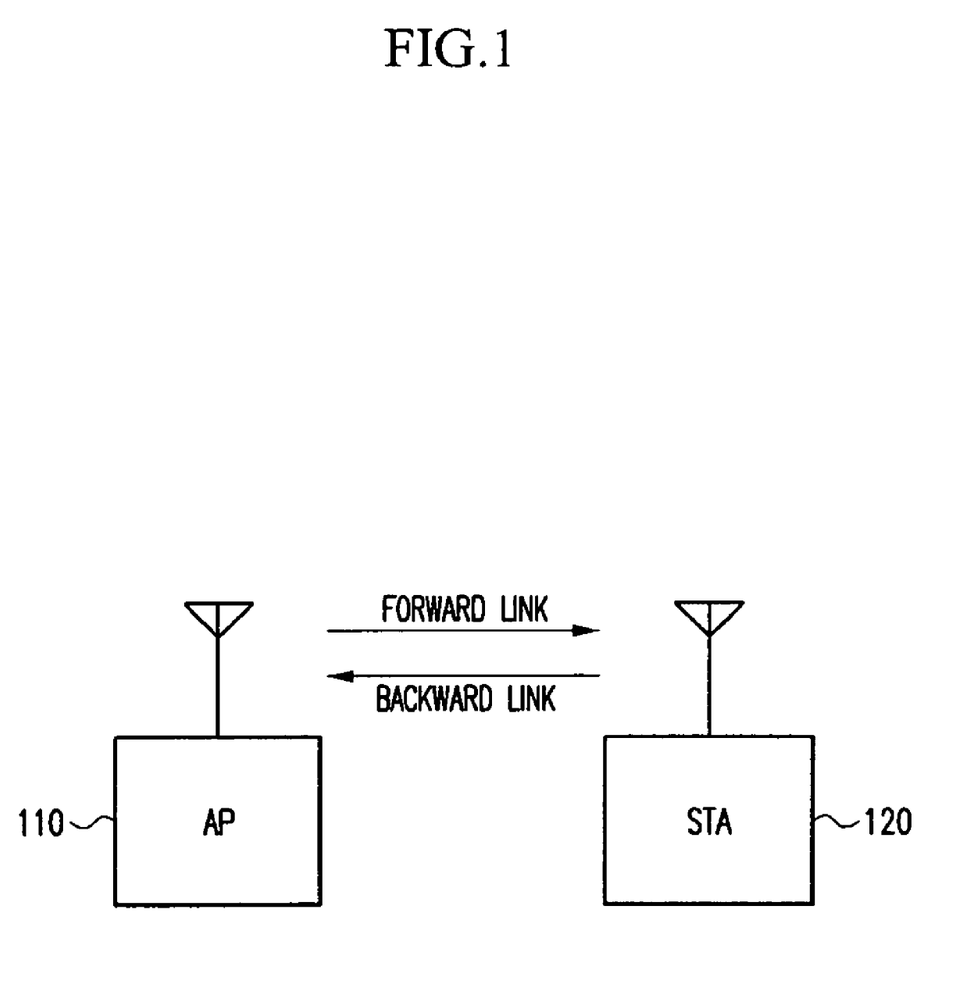
FIG. 1 shows a forward link and a backward link of a wireless communication system including an AP and a STA.

FIG. 1 shows a forward link and a backward link of a wireless communication system including an AP 110 and a STA 120. Referring to FIG. 1, a data transmission link from the AP 110 to the STA 120 is called a forward link and a data transmission link from the STA 120 to the AP 110 is called a backward link, in general.

When the two links are asymmetrical, a level of interference at a receiving side is varied with the position of the receiving side and it is different from a level of interference at a transmitting side. Thus, a transmission power and a modulation method for data transmission of the transmitting side should be decided at least partially from the standpoint of the receiving side.

For this, the STA monitors a channel state of the forward link to propose a transmission modulation method suitable for the AP when the STA communicates with the AP. Furthermore, link adaptation through a feedback method is required when backward data needed to decide the modulation method is transmitted.

A conventional data transmission and reception technique depending on a wireless link state is disclosed in U.S. Pat. No. 6,567,375, entitled "Method and Apparatus for Packet Size Dependent Link Adaptation for Wireless Packet", which proposed a technique that changes a packet length and a coding method depending on a wireless link state to reduce data transmission delay time. However, this technique did not consider various parameters in a wireless communication system other than the packet length and coding method, and proposed only a method of shortening the data transmission delay time. Furthermore, it cannot solve problems with respect to system transmission capacity and power consumption of stations.

SUMMARY OF THE INVENTION

It is an advantage of the present invention to provide a link adaptation method using feedback information for a wireless communication system, which performs link adaptation in consideration of various parameters applied to the wireless communication system to reduce data transmission delay time, increase the transmission capacity of the communication system, and decrease power consumption of the system.

In one aspect of the present invention, a link adaptation method using feedback information of a wireless data communication system for transmission and reception of data between at least two nodes of the wireless data communication system, comprises a step (a) in which a first node transmits a link margin information request message to a second node; a step (b) in which the second node estimates a SNR value between the first and second nodes using the link margin information request message, and compares the estimated SNR value with a predetermined SNR value designated in a white noise table to presume a link margin value; a step (c) in which the second node selects one of a predetermined white noise table and a delay spread table to presume a link margin according to the comparison result, and transmits the presumed link margin to the first node; and a step (d) in which the first node adjusts a transmission rate and transmission power according to a current data transmission mode using the presumed link margin received from the second node, and one of the white noise table and delay spread table, selected by the first node.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention.

Accordingly, the drawings and description are to be regarded as illustrative in nature, and not restrictive.

The present invention proposes a link adaptation method in consideration of a feedback mechanism for a communication link or channel in order to decide the optimum modulation method and transmission power for a wireless data communication link.

Feedback information used for the link adaptation method of the invention is a link margin that is defined as a difference between a signal-to-noise ratio measured at a receiver and a signal-to-noise ratio suitable for a method of modulating currently received data.

The link margin means a power level higher than a signal power required for the current communication modulation method from the standpoint of the receiver. When the link margin is a positive number, it represents that reception power is higher than a required level. When the link margin is a negative number, it means a lack of reception power.

A procedure of calculating a link margin value and feeding back it is described below.

Figure 2:
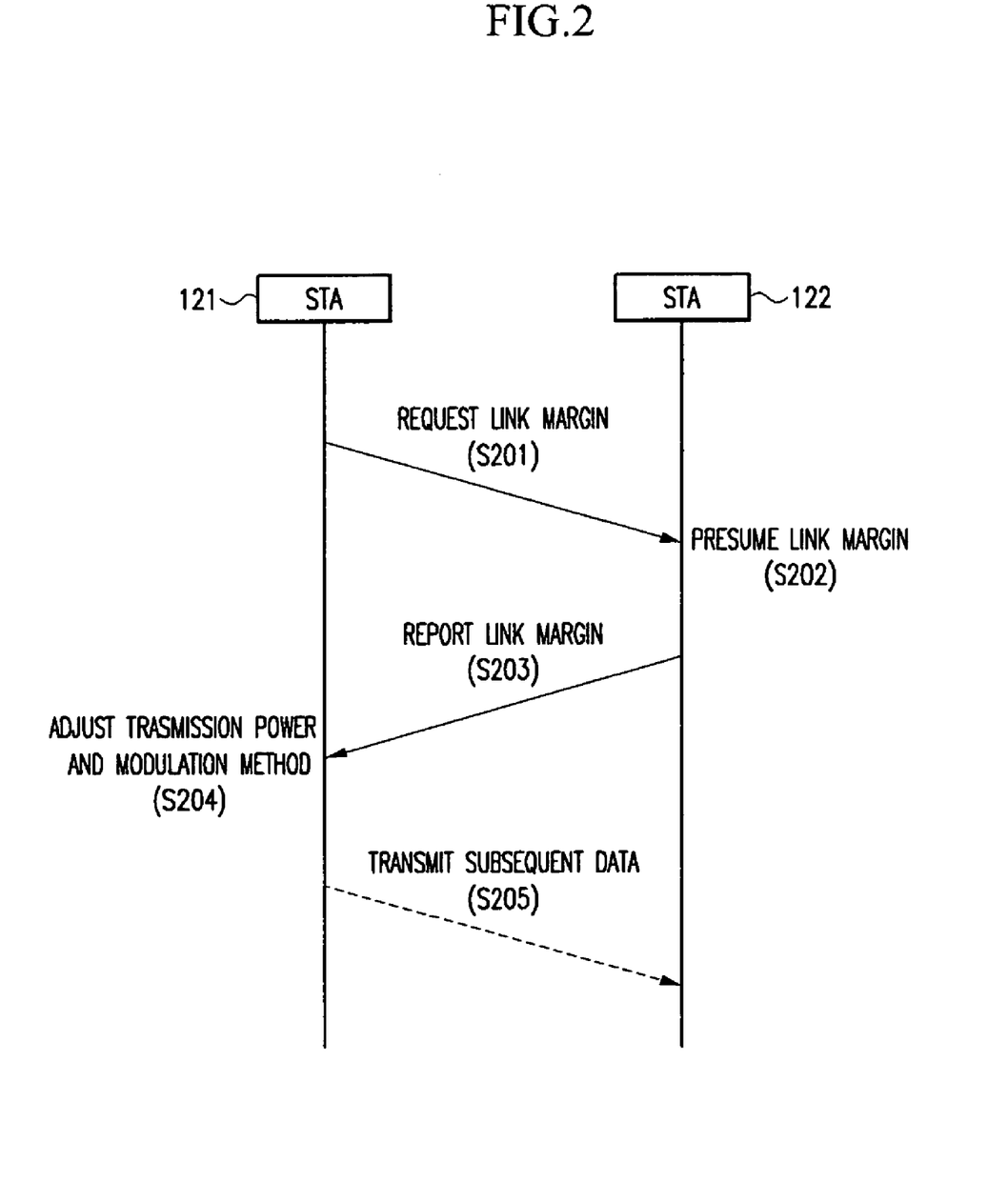
FIG. 2 shows a procedure of transmitting a link margin request and reporting a link margin for link adaptation according to an embodiment of the present invention.

FIG. 2 shows a procedure of transmitting a link margin request and reporting a link margin for link adaptation according to an embodiment of the present invention. Referring to FIG. 2, when a STA 121 transmits/receives data to/from a STA 122, the STA 121 delivers a link margin request packet to the STA 122 to grasp the state of a wireless data line connected to the STA 122 in step S201.

The STA 122 estimates the state of the link, which is represented by a signal-to-noise ratio (referred to as SNT hereinafter), using the link margin request packet to presume a link margin that represents a difference between a desired transmission power and currently used transmission power of the STA 121 in units of dB in step S202. Then, the STA 122 transmits a link margin report packet including the presumed link margin information to the STA 121 in step S203.

The STA 121 adjusts a transmission power and a modulation method depending on the received link margin report packet in step S204, and applies the adjusted transmission power and modulation method to transmission of next data in step S205. Here, the operation of requesting the link margin and adjusting the transmission power and modulation method depending on the link margin is called link adaptation. The link adaptation is carried out in each of a physical layer and a media access control layer.

Figure 3:
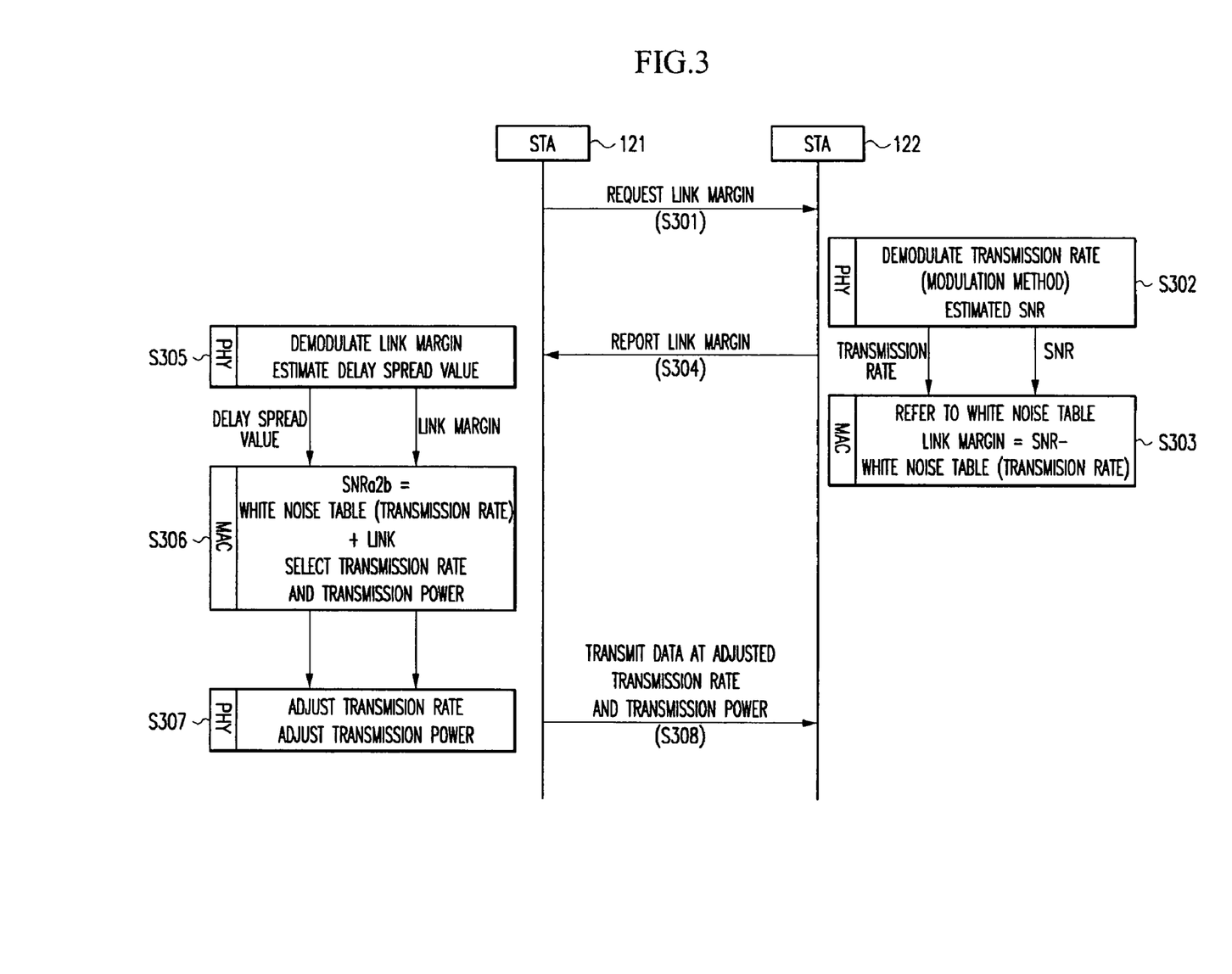
FIG. 3 shows a procedure of exchanging information required for link adaptation between stations and operations carried out between a physical layer and a media access control layer of each station.

FIG. 3 shows a procedure of exchanging information required for link adaptation between the stations and operations carried out between a physical layer and a media access control layer of each station. Referring to FIG. 3, first of all, the STA 121 transmits the link margin request packet to the STA 122 in step S301. Here, the link margin request packet includes information about a modulation method used in a corresponding link and information about a data transmission rate.

The STA 122 that has received the link margin request packet demodulates the packet to extract information about the modulation method and data transmission rate and estimates a SNR in step S302, which is carried out by the physical layer of the STA 122.

The modulation method, data transmission rate, and SNR obtained by the physical layer are delivered to the media access control layer of the STA 122. Then, the media access control layer obtains the link margin using the modulation method, data transmission rate, SNR, and a predetermined table in step S303. The table represents data transmission rates and SNRs required therefor and uses a white noise table in a white noise environment.

Table 1 shows a general form of a table in the white noise channel environment.

TABLE 1

| Transmission rate | SNR: Table. Transmission rate n required in white noise channel environment for satisfying transmission rate n |
|---|---|
| Transmission rate 1 (modulation method 1) | $SNRw_1$ |
| Transmission rate 2 (modulation method 2) | $SNRw_2$ |
| . | . |
| . | . |
| Transmission rate n (modulation method n) | $SNRw_n$ |
| . | . |
| . | . |
| Transmission rate N (modulation method N) | $SNRw_N$ |

In Table 1, $SNRw_n$ denotes a signal-to-noise ratio required for achieving transmission rate n that is a function of modulation method n in the white noise environment. Table.Transmission rate n represents a signal-to-noise ratio that a given channel environment (white noise or delay spread channel) and transmission rate require.

When the physical layer and media access control layer of the STA 122 complete the step of presuming the link margin using the white noise table of Table 1, the STA 122 reports the link margin to the STA 121 using the link margin report packet in step S304.

The physical layer of the STA 121 demodulates the received link margin report packet to extract a link margin presumption value and estimates a delay spread value of the link between the STA 121 and STA 122 in step S305. Here, the delay spread value is used for deciding an actually required transmission power and transmission modulation method. Furthermore, the delay spread value is utilized to select a table in a white noise channel environment or a table in a delay spread channel environment. Table 2 shows the table in the delay spread channel environment.

TABLE 2

| Transmission rate | SNR: Table. Transmission rate n required in delay spread channel environment for satisfying transmission rate n |
|---|---|
| Transmission rate 1 (modulation method 1) | $SNRd_1$ (delay spread value) |
| Transmission rate 2 (modulation method 2) | $SNRd_2$ (delay spread value) |
| . | . |
| . | . |
| Transmission rate n (modulation method n) | $SNRd_n$ (delay spread value) |
| . | . |
| . | . |
| Transmission rate N (modulation method N) | $SNRd_N$ (delay spread value) |

In Table 2, $SNRd_n$ represents a signal-to-noise ratio required for achieving transmission rate n in the delay spread channel environment. Transmission 1 is lower than transmission N, and transmission 2 through transmission N−1 are sequentially increased. Table.Transmission rate n, that is, a required transmission power, is increased as transmission N is increased.

The link margin presumption value extracted by the physical layer of the STA 121 and the delay spread value estimated by the physical layer are delivered to the media access control layer. The media access control layer estimates a SNR value based on the link margin presumption value and decides a SNR value required for the modulation method depending on the delay spread value in step S306. The media access control layers of the STA 121 and STA 122 share a table such as Table 1 and Table 2.

$SNR_{a2b}$ in step S306, shown in FIG. 3, is an estimated SNR of the channel that links the STA 121 to the STA 122.

The media access control layer of the STA 121 delivers a transmission rate and transmission power of subsequent data to the physical layer. Then, the physical layer applies the received values to the current transmission rate and transmission power to adjust them in step S307.

Data subsequently transmitted from the STA 121 to the STA 122 is delivered with the adjusted transmission rate and transmission power in step S308.

The link adaptation procedure in various modes is explained below in more detail.

Figure 4:
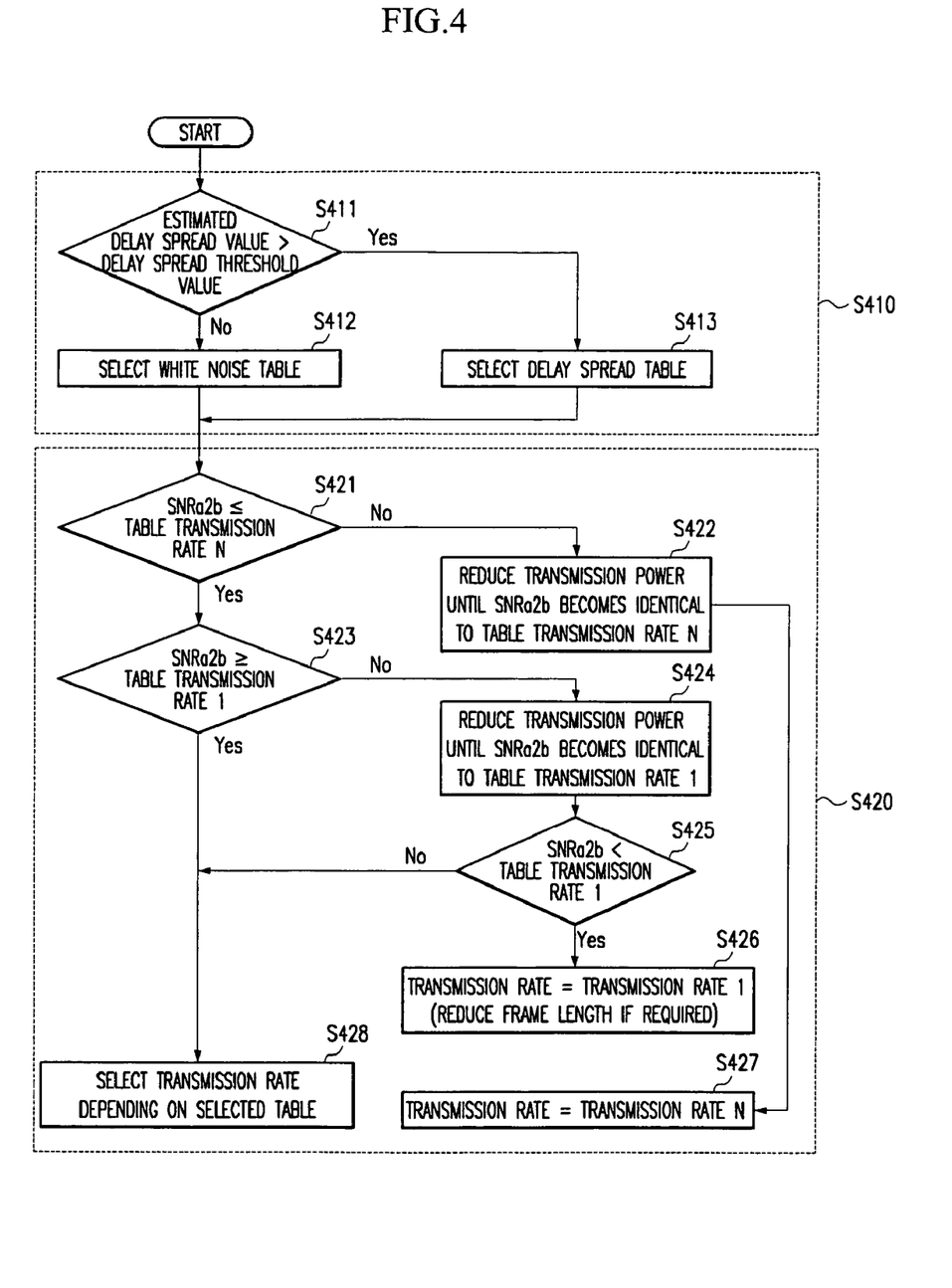
FIG. 4 is a flow chart of link adaptation in a normal mode according to an embodiment of the present invention.

FIG. 4 is a flow chart of link adaptation in a normal mode according to an embodiment of the present invention. Referring to FIG. 4, the link adaptation includes a process S410 of selecting a table and a process S429 of selecting a transmission rate and a transmission power.

Specifically, the STA 121 compares the delay spread value estimated using the link margin report received from the STA 122 with a predetermined delay spread threshold value in step S411. When the estimated delay spread value is greater than the predetermined delay spread threshold value, the STA 121 selects the delay spread table of Table 2 as a reference table in step S413. When the estimated delay spread value is less than or identical to the predetermined delay spread threshold value, the STA 121 selects the white noise table of Table 1 as the reference table in step S412.

When the reference table is selected, the STA 121 compares the estimated $SNR_{a2b}$ transmitted from the STA 122 with the SNR supporting a maximum transmission rate in the reference table, that is, Table.Transmission rate N (=$SNRd_N$ or $SNRw_N$) in step S421. When $SNR_{a2b}$ is higher than Table.Transmission rate N, which means that the transmission power is unnecessarily used, the STA 121 reduces the transmission power until $SNR_{a2b}$ corresponds to Table.Transmission rate N in step S422. When the reduced transmission power corresponds to transmission rate N, the transmission power is used for transmitting data in step S427.

When $SNR_{a2b}$ is lower than Table.Transmission rate N in step S421, the STA 121 compares $SNR_{a2b}$ with Table.Transmission rate 1 supporting a minimum transmission rate in step S423. If $SNR_{a2b}$ is lower than Table.Transmission rate 1, the STA 121 increases the transmission power of $SNR_{a2b}$ until it corresponds to the transmission power of Table.Transmission rate 1 in step S424, and sets a wireless communication transmission rate to transmission rate 1 in step S426.

If $SNR_{a2b}$ is lower than Table.Transmission rate 1 even when the transmission power is increased to the maximum power in step S425, the minimum transmission rate, transmission rate 1, is selected as the transmission rate because the maximum power is restricted by the wireless communication system. The minimum transmission rate is used when subsequent data is transmitted in step S426. Here, a frame length can be decreased if required.

When $SNR_{a2b}$ is increased to become higher than Table.Transmission rate 1 in step S424, a transmission rate is selected depending on the table selected in step S410 and used for data transmission in step S428.

Figure 5:
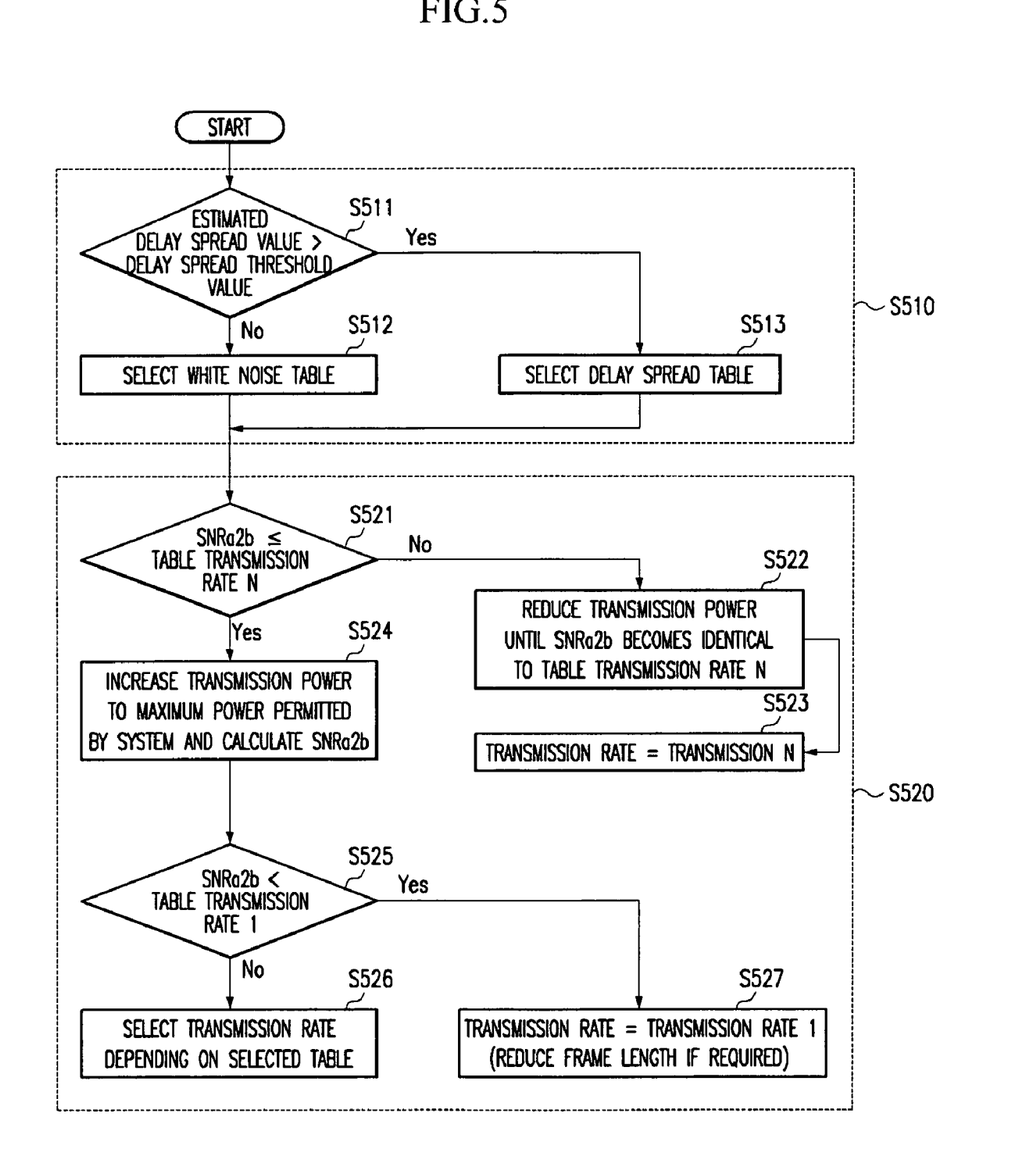
FIG. 5 is a flow chart of link adaptation in a high-rate data transmission mode according to an embodiment of the present invention.

FIG. 5 is a flow chart of link adaptation in a high-rate data transmission mode according to an embodiment of the present invention. In the high-speed data transmission mode, a table-selecting process S510 corresponds to the table-selecting process 410 shown in FIG. 4.

After the table is selected, the STA 121 compares $SNR_{a2b}$ with Table.Transmission rate N in step S521. When $SNR_{a2b}$ is higher than Table.Transmission rate N, the STA 121 reduces the transmission power until $SNR_{a2b}$ corresponds to Table.Transmission rate N in step S522 and uses transmission rate N as the transmission rate in step S523.

When $SNR_{a2b}$ is lower than Table.Transmission rate N in step S521, the STA 121 increases the transmission power to the maximum power permitted by the system, and calculates $SNR_{a2b}$ depending on the maximum power in step S524. When $SNR_{a2b}$ is higher than Table.Transmission rate 1, the STA 121 selects a transmission rate according to the selected table in step S526. When $SNR_{a2b}$ is lower than Table.Transmission rate 1, the STA uses transmission rate 1 as the transmission rate in step S527. Here, the frame length can be reduced if required.

The above-described operation selects a transmission rate for transmitting data at a high rate while minimizing unnecessary power consumption.

Figure 6:
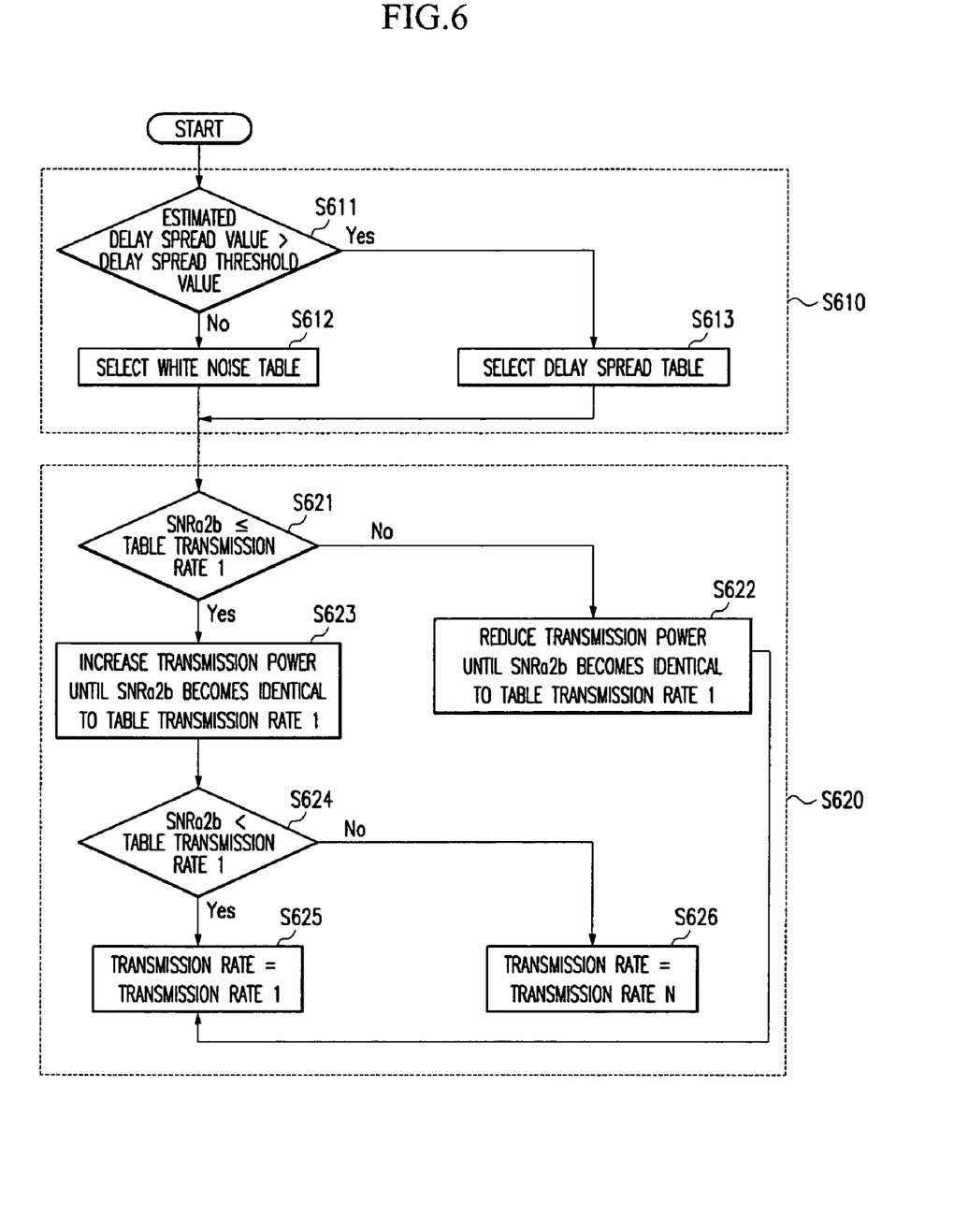
FIG. 6 is a flow chart of link adaptation in a transmission power saving mode according to an embodiment of the present invention.

FIG. 6 is a flow chart of link adaptation in a transmission power saving mode according to an embodiment of the present invention. In the transmission power saving mode, a table-selecting process S610 corresponds to those of FIGS. 4 and 5.

When the table is selected in step S610, the STA 121 compares $SNR_{a2b}$ with Table.Transmission rate 1 in step S621 in order to select a transmission power depending on Table.Transmission rate 1 corresponding to the minimum transmission power. When $SNR_{a2b}$ is higher than Table.Transmission rate 1, the STA 121 reduces the transmission power until $SNR_{a2b}$ corresponds to Table.Transmission rate 1 in step S622, and uses Table.Transmission rate 1 as the transmission rate in step S625.

When $SNR_{a2b}$ is lower than Table.Transmission rate 1 in step S621, the STA 121 increases the transmission power until $SNR_{a2b}$ corresponds to Table.Transmission rate 1 in step S623. Here, the transmission power is restricted by the wireless communication system. Accordingly, If $SNR_{a2b}$ is lower than Table.Transmission rate 1 even when the transmission power has been increased to the maximum power, transmission rate 1 is used as the transmission rate in step S625. When $SNR_{a2b}$ becomes higher than or identical to Table.Transmission rate 1, data is transmitted at transmission rate N in step S626.

According to the aforementioned methods, link adaptation between the receiver and transmitter in the wireless data communication system is carried out in the normal, high-rate data transmission and transmission power saving modes to obtain the optimum result in each mode.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the link adaptation method using feedback information for a wireless communication system according to the present invention can perform link adaptation between a transmitter and a receiver using a feedback mechanism between the transmitter and receiver to improve the transmission capacity of the system. Furthermore, the present invention can optimize a link state, extend power utilization time of a station, and reduce interference between stations.

What is claimed is:

1. A link margin adaptation method using feedback information of a wireless data communication system for transmission and reception of data between a first node and a second node of the wireless data communication system, comprising:

transmitting a link margin information request message from the first node to the second node for the second node to estimate an SNR value between the first and second nodes by using the link margin information request message;

comparing, at the second node, the SNR value with a predetermined SNR value designated in a white noise table to presume a link margin value;

receiving, at the first node, a packet including the link margin value;

estimating, at the first node, a delay spread value from the packet and comparing the delay spread value with a threshold value;

using, at the first node, a delay spread table as a selected table when the delay spread value is greater than a threshold value, and using the white noise table as the selected table when the delay spread value is less than or identical to the threshold value; and adjusting, at the first node, a transmission rate and transmission power according to a current data transmission mode based on a relation between the link margin value and SNR values in the selected table, wherein the white noise table is a table including a first set of transmission rates and of corresponding SNRs that satisfy the first set of transmission rates in a white noise channel environment, wherein the delay spread table is a table including a second set of transmission rates and corresponding SNRs that satisfy the second set of transmission rates in a delay spread channel environment, and wherein the adjusting comprises:

comparing a maximum SNR that supports a maximum transmission rate of the selected table with an estimated SNR estimated with the link margin value; and decreasing a transmission power until the estimated SNR corresponds to the maximum SNR, and setting a transmission rate between the first and second nodes to the maximum transmission rate of the selected table when the estimated SNR is higher than the maximum SNR.

2. The link margin adaptation method as claimed in claim 1, wherein the first and second nodes share the white noise table or the delay spread table.

3. The link margin adaptation method as claimed in claim 1, wherein the adjusting further comprises:

comparing the estimated SNR with a minimum SNR that supports a minimum transmission rate of the selected table; and when the estimated SNR is lower than the minimum SNR, increasing the transmission power until the estimated SNR corresponds to the minimum SNR.

4. The link margin adaptation method as claimed in claim 3, wherein the transmission power does not exceed a predetermined maximum transmission power of the wireless communication system, and when the estimated SNR does not correspond to the minimum SNR even when the transmission power is increased to the maximum transmission power, the transmission rate between the first and second nodes is set to the minimum transmission rate of the selected table.

5. The link margin adaptation method as claimed in claim 3, wherein the adjusting further comprises:

deciding the transmission rate between the first and second nodes using the selected table and estimated SNR when the estimated SNR is lower than the maximum SNR and higher than the minimum SNR.

6. The link margin adaptation method as claimed in claim 1, wherein the adjusting comprises:

comparing a maximum SNR that supports the maximum transmission rate of the selected table with the estimated SNR estimated with the link margin value;

increasing the transmission power to the maximum transmission power permitted by the wireless communication system and calculating a new SNR when the estimated SNR is lower than the maximum SNR; and comparing the new SNR with the minimum SNR of the selected table, and when the new SNR is lower than the minimum SNR, setting the transmission rate between the first and second nodes to a transmission rate corresponding to the minimum SNR.

7. The link margin adaptation method as claimed in claim 6, wherein the adjusting comprises:

decreasing the transmission power until the estimated SNR corresponds to the maximum SNR, and setting the transmission rate between the first and second nodes to a transmission rate corresponding to the maximum SNR when the estimated SNR is higher than the maximum SNR.

8. The link margin adaptation method as claimed in claim 6, wherein the adjusting comprises:

setting the transmission rate between the first and second nodes using the selected table and the new SNR when the new SNR is higher than the minimum SNR.

9. The link margin adaptation method as claimed in claim 1, wherein the adjusting comprises:

comparing the minimum SNR that supports the minimum transmission rate of the selected table with the estimated SNR included in the link margin transmitted from the second node; and decreasing the transmission power until the estimated SNR corresponds to the minimum SNR, and setting the transmission rate between the first and second nodes to a transmission rate corresponding to the minimum SNR when the estimated SNR is higher than the minimum SNR.

10. The link margin adaptation method as claimed in claim 9, wherein the adjusting comprises:

increasing the transmission power up to a maximum transmission power permitted by the wireless communication system until the estimated SNR corresponds to the minimum SNR, and when a SNR at the maximum transmission power is lower than the minimum SNR, setting the transmission rate between the first and second nodes to a transmission rate corresponding to the minimum SNR.

* * * * *